April 12, 1927.
G. GRAF
1,624,728
PROTECTIVE DEVICE
Filed June 24, 1925
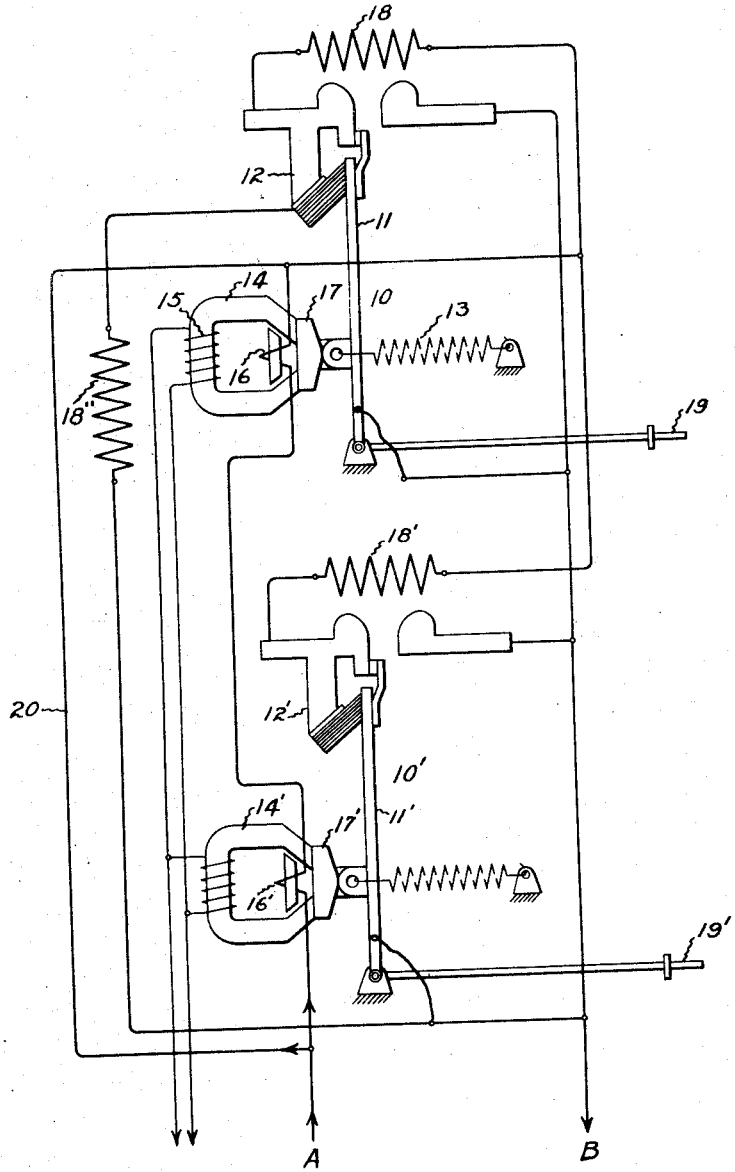
Inventor:
Georg Graf,
by *Alexander F. Lundt*
His Attorney.

Patented Apr. 12, 1927.

1,624,728

UNITED STATES PATENT OFFICE.

GEORG GRAF, OF BERLIN-PANKOW, GERMANY, ASSIGNOR TO GENERAL ELECTRIC COMPANY, A CORPORATION OF NEW YORK.

PROTECTIVE DEVICE.

Application filed June 24, 1925, Serial No. 39,370, and in Germany October 27, 1924.

This invention relates to protective devices for electric circuits and more particularly to protective devices employing high speed circuit breakers of the type which are strongly biased to the circuit interrupting position, electromagnetically held in the circuit closing position, and electromagnetically released responsively to overload current.

When high speed circuit breakers of the above type are designed for heavy duty service, the increased force of the biasing springs which operate the circuit breaker to the circuit opening position, together with the necessarily increased mass of the moving elements, produce undesirable and destructive jars or shocks when the circuit interrupter operates. By means of my invention such excessive jars and shocks are avoided and circuit interrupters of standard size and capacity may be employed to protect heavy duty circuits. This is accomplished in accordance with my invention by connecting a plurality of high speed circuit interrupters of standard size and capacity in multiple in the heavy duty circuit and arranging the interrupters to operate substantially simultaneously responsively to overload conditions. It is necessary that the interrupters operate substantially simultaneously as, otherwise, the high speed interrupter which is the last to respond to the overload condition must interrupt the circuit which is beyond its normal interrupting capacity.

In carrying my invention into effect the simultaneous operation of the multiple high speed circuit interrupters is insured by connecting the series windings of the several interrupters in series in the controlled circuit. In this way the series winding of each interrupter is energized responsively to the same value of current and hence with proper adjustment the several interrupters will open at substantially the same instant upon the occurrence of an overload in the controlled circuit.

The single figure of the accompanying drawing shows an embodiment of the invention in a protective system for an electric circuit employing a pair of multiple connected high speed circuit interrupters.

Each of the circuit interrupters 10 and 10' illustrated in the drawing is of the high speed type described and claimed in the Tritle reissue Patent No. 15,441, dated August 29, 1922, and comprises essentially a movable circuit controlling member 11 which is strongly biased out of engagement with the cooperating stationary contact member 12 by means of biasing spring 13 and is electromagnetically held in the circuit closing position by holding electromagnet 14 having a shunt holding winding 15 and a series releasing winding 16. As described and claimed in the above mentioned Tritle patent, and as more particularly described and claimed in the patent of Leonhard Haag, No. 1,506,483, issued August 26, 1924, to the assignee of my present invention, the arrangement of the series winding preferably is such that the flux set up in the holding electromagnet 14 by the shunt winding 15 is shifted from the magnetic member 17, carried by the movable circuit controlling member 11 when the energizing current in the series winding 16 is above a predetermined value. It will be understood that the corresponding parts of circuit interrupter 10' are constructed and arranged in a similar manner.

In the particular arrangement illustrated circuit interrupters 10 and 10' afford protection to the controlled circuit extending through the conductors A, B, by inserting the current limiting resistor 18 in the controlled circuit when both of the interrupters are open.

The interrupters 10 and 10' may be separately closed by means of the closing handles 19 and 19' respectively or by suitable electromagnetic closing mechanism if desired. Upon the occurrence of an overload in the controlled circuit which extends from the conductor A through the series windings 16' and 16 in parallel circuit with the shunt 20 and thence through the blowout windings 18 and 18' and the circuit controlling members 11, 12 and 11', 12', in multiple circuit to the conductor B, the windings 16 and 16' are energized by the same current and serve to substantially simultaneously shift the flux of the holding electromagnets 14 and 14' from the magnetic members 17 and 17'. This permits the simultaneous opening of the interrupters 10 and 10' to insert the current limiting resistor 18'' in the controlled circuit.

Thus it will be seen that by means of my invention multiple connected high speed interrupters of standard size and capacity, and each having a movable circuit controlling member of low inertia, may be employed to simultaneously control an electric circuit which is beyond the capacity of the separate interrupters.

What I claim as new and desire to secure by Letters Patent of the United States, is:—

1. A protective circuit controlling device comprising a plurality of independently movable circuit controlling members connected in multiple in the controlled circuit, each of said members being biased to the circuit opening position, electro-responsive means for separately holding each of said members in the circuit closing position, and separate means energized in series circuit responsively to the current in the circuit and arranged to magnetically cooperate with said electro-responsive means to simultaneously effect the release of said circuit controlling members.

2. A protective device for electric circuits comprising a plurality of high speed circuit interrupters, each having a circuit controlling member biased to the open position and provided with an electromagnet having a shunt winding for holding the circuit controlling member in the closed position, and a series winding for releasing the member, and connections whereby said interrupters are connected in multiple in the controlled circuit and the said series windings are connected in series in the controlled circuit to effect the simultaneous release of the members.

3. A protective device for electric circuits comprising a current limiting resistor, a plurality of high speed circuit interrupters connected to separately control a short circuit around the said resistor, each of said circuit interrupters being biased to the circuit opening position and provided with an electromagnet having a shunt winding for holding the interrupter in the closed position and a series winding for effecting the release of the circuit controlling member, and connections whereby said series windings are connected in series in the controlled circuit to effect the simultaneous release of the members.

In witness whereof I have hereunto set my hand this 3rd day of June 1925.

GEORG GRAF.